United States Patent [19]

Schmidberger et al.

[11] 4,336,242
[45] Jun. 22, 1982

[54] HARD FERRITE POWDER AND PROCESS FOR THE PREPARATION THEREOF

[75] Inventors: Rainer Schmidberger, Bermatingen; Hilmar Franke, Friedrichshafen, both of Fed. Rep. of Germany

[73] Assignee: Dornier System GmbH., Fed. Rep. of Germany

[21] Appl. No.: 95,302

[22] Filed: Nov. 19, 1979

[30] Foreign Application Priority Data

Nov. 19, 1978 [DE] Fed. Rep. of Germany ....... 2850108

[51] Int. Cl.$^3$ .......................................... C01G 49/00
[52] U.S. Cl. .................................... 423/594; 423/265
[58] Field of Search ............... 423/593, 594, 600, 595, 423/596

[56] References Cited

U.S. PATENT DOCUMENTS

| | | | |
|---|---|---|---|
| 1,940,409 | 12/1933 | Fink | 423/594 |
| 2,985,506 | 5/1961 | Di Vita et al. | 423/598 |
| 3,189,550 | 6/1965 | Malinofsky | 423/594 |
| 3,378,335 | 4/1968 | Ellis et al. | 423/594 |
| 3,630,667 | 12/1971 | Shirk | 423/594 |
| 3,751,366 | 8/1973 | Bomar et al. | 423/594 |
| 3,794,720 | 2/1974 | Nye | 423/594 |
| 3,830,743 | 8/1974 | Schlaudt et al. | 423/594 |
| 3,895,092 | 7/1975 | Sironi et al. | 423/594 |

FOREIGN PATENT DOCUMENTS

| | | | |
|---|---|---|---|
| 645347 | 6/1964 | Belgium | 423/594 |
| 1221426 | 2/1971 | United Kingdom | 423/594 |

Primary Examiner—Herbert T. Carter
Attorney, Agent, or Firm—James E. Bryan

[57] ABSTRACT

A hard ferrite powder with the composition BaO.6-Fe$_2$O$_3$ composed of particles in the size range from about 1 to 10 microns and being easily separated into primary grains (monocrystal domains) which contain at least about 85% of primary grains with hexagonal lattice structures and sizes equal to or less than 0.5 micron.

12 Claims, 4 Drawing Figures

MANUFACTURE OF Ba FERRITE POWDER

CONVENTIONAL

REACTION SPRAY DRYING

MANUFACTURE OF Ba FERRITE POWDER

CONVENTIONAL

REACTION SPRAY DRYING

HARD FERRITE POWDER AND PROCESS FOR THE PREPARATION THEREOF

This invention relates to a hard ferrite powder with the composition of BaO.6Fe$_2$O$_3$ and a process for preparing the hard ferrite powder, it being known to subject a common solution of iron salts and barium salts in water to a heat treatment at high temperatures in a reaction vessel.

Hard ferrites are oxidic permanent magnet materials with a high coercive field strength, that is, these are magnetic materials which are difficult to demagnetize. They are used, among other applications, in DC motors.

Ordinarily hard ferrites are of the composition BaO.6Fe$_2$O$_3$, where Sr and Pb are also used in lieu of Ba and where the proportion of the oxide portions also can deviate from 6 (for instance 5.5 to 6.5). They also include additions to improve sintering, the lattice structure, to increase the coercive field strength and/or remanence.

The coercive field strength of hard ferrite powders is essentially determined by the grain size of the monocrystalline domains (primary grains) in the particles, as the creation of Bloch walls is directly related to the particle size by the number of the lattice defects which may act as possible nucleating agents for the formation of Bloch walls. The smaller the monocrystalline domains, the higher the coercive field strength, as long as the boundary to the superparamagnetic particles is not crossed, where magnetic reversal takes place by thermal activation.

The following references in the literature disclose processes for the preparation of ferrites:
1. CERAMIC BULLETIN, Vol. 47, #2, (1968), "Magnetic Ceramics —A Review and Status Report", pp. 186–195;
2. PREPARATION OF FERRITES BY THE ATOMIZING BURNER TECHNIQUE, Lincoln Lab., Massachusetts Institute of Technology;
3. T. AKASHI, T. TSUJI, Y. ONODA — Sintering of Ferrite Powder Prepared by a New Spray-Roasting Technique;
4. JOURNAL DE PHYSIQUE, April 1977 — Fast Reaction Sintering Process for the Production of Ferrites;
5. German Offenlegungsschrift No. 2,403,900;
6. BERICHTE DER DEUTSCHEN KERAMISCHEN GESELLSCHAFT 55 (1978) #4, pp. 194–197, "Synthetische Keramische Rohstoffe";
7. British Pat. No. 888,688; and
8. U.S. Pat. No. 3,378,335.

Reference 1 mentions on page 190 the hard ferrite composition initially mentioned herein.

Reference 2 relates to soft ferrites. A solution of the metal nitrates in alcohol is sprayed, or burned with oxygen. A highly homogeneous powder is formed, which is separated in a cyclone.

Reference 3 concerns a so-called "spray-roasting" process for preparing soft ferrites. A solution of metallic components in HNO$_3$ is decomposed in a spray dryer at temperatures between 350° C. and 400° C. As no spinel structure is obtained thereby, the powder cannot be used for making oriented magnets. The volume shrinkage is very high in sintering because the powder contains undecomposed nitrates.

Reference 4 discloses making hard ferrites from a suspension of the participating metal oxides, the suspension being sprayed into a hot reaction tube. The mixed oxide is formed by solid reaction. Because suspensions are used, the homogeneity obtained is low and the process steps in mixing and preparing the powders are costly.

Reference 5 describes a similar process, additional components being added in a very homogeneous manner in the form of water-soluble salts.

Reference 6 discloses various methods for preparing powders, for instance spray-roasting processes. The spraying takes place in burners. This reference also mentions low-temperature spray-drying of solutions, which, as described in reference 3, is suitable for making intimately mixed salt mixtures.

Reference 7 (British Pat. No. 888,688) discloses spraying a common solution of iron and barium salts in water at high temperatures into a flame and to so make a barium ferrite powder which, by quenching, exhibits an amorphous structure and therefore has soft-magnetic properties. By a subsequent heat treatment of these soft-magnetic powders, the crystalline and hence hard magnetic ferrite structure can be obtained. Because this heat tratment must be applied to powders in bulk, there is the danger of sintering the individual powder particles together, whereby the powder is no longer workable (compressible and orientable in a magnetic field).

Reference 8 (U.S. Pat. No. 3,378,335) also describes the use of common solutions of barium and iron salts which are thermally decomposed by being sprayed into a hot reaction vessel, the product is obtained however having magnetic properties up to only about 50%. This is due to the process parameters used. The powder so made cannot be used for manufacturing oriented magnets. Post-treatment also fails to obtain magnets with high coercive field strengths and magnetizations of saturation.

It is the object of the present invention to provide hard ferrite powders for hard ferrites with as high as possible a coercive field strength and high magnetization of saturation, which furthermore have a high sintering activity and are suitable for the manufacture of oriented (anisotropic) magnets.

This problem is solved by the invention for a hard ferrite powder with the composition of BaO.6Fe$_2$O$_3$ in that the powder is composed of particles in the size range of 1 to 10 microns and is easily separable into primary grains (monocrystalline domains), the particles being composed of at least 85% primary grains with an hexagonal lattice structure and hard magnetic properties and of sizes equal to or less than 0.5 micron.

In the process of the invention for preparing such hard ferrite powders, a 0.05 to 0.3 molar solution, based upon the end product BaFe$_{12}$O$_{19}$, is sprayed by means of single material or two-material nozzles in the stoichiometric ratios of the metallic components of this composition into a hot zone of a reaction vessel, the drop size being less than 30 microns, first evaporating the water at a particle temperature which rises to 900° C., and at a dwell time of 2–10 seconds at a particle temperature of 700° to 900° C., leaving behind the solid particles composed of the metal components and of the anionic components of the dissolved salts. With further heating, the anions are split-off with simultaneous oxide formation of the contained metal components, and the mixed oxide BaFe$_{12}$O$_{19}$ is produced in crystalline form as a particle in the size range from 1 to 10 microns.

An essential characteristic of the process is that during the entire reaction, as little as possible de-mixing or no de-mixing of the individual components takes place, that is, the homogeneous distribution of the substances dissolved in the solution is retained during the entire reaction.

To that end, the reaction must be carried out so rapidly (for instance evaporation within 1/10 of a second) that during evaporation of the solvent, the most minimal possible fractional precipitation of individual salts takes place that would lead to a local de-mixing of the individual components, and in the further reaction (the mixture of metal salts converting into mixed oxides), no compounds volatile at the temperatures of reaction may be created. Therefore, the iron and barium salts must be converted in the solid state into the mixed oxide. When preparing hard ferrite powders, this can be achieved by using iron (II)-chloride ($FeCl_2$) as the initial substance, as it sublimes only above 670° C., whereas iron(III)-chloride evaporates at temperatures below 300° C.

When using $FeCl_2$ and strontium or barium salts as the initial substances in the process of the invention, the hard ferrite powder is obtained with the desired properties, but when using $FeCl_3$ in lieu of $FeCl_2$, essentially a mixture of $Fe_2O_3$ and BaO or SrO is formed, the $Fe_2O_3$ being obtained in finest form because it is formed by a homogeneous gaseous reaction.

There is no advantage in using iron and barium (strontium) as the chlorides when the chlorides are used as the initial substance. The alkaline earth chlorides are so stable that a completed reaction into hexaferrite takes place only at powder temperatures above 1,000° C.

Rather, the process of the invention rests on using iron in the form of iron chloride and barium or strontium in the form of the nitrate. When evaporating the solvent from the droplets in the reactor, first the low-solubility alkaline earth nitrate will precipitate, and then the iron chloride. The alkaline earth nitrates can be converted into the oxides at very low temperatures, whereby the completed reaction into hexaferrite is nearly obtained at powder temperatures of about 900° C.

The separation into primary grains takes place, for instance, by a brief grinding process which serves only to separate the individual primary grains and thereby to make them alignable in the magnetic field. If grinding were more intense, the coercive field strength would be decreased because of the increasing number of lattice defects in the primary grains. In the preparation processes of the state of the art, small primary grains can be obtained only by intensive grinding, whereby, as mentioned, the coercive field strength is much degraded.

The ferrite powder of the invention is composed of individual particles with diameters of about 1 to 10 microns, which again are composed of monocrystalline domains (primary grains). The hexagonal ferrite structure is formed completely or at least extensively (>85%), whereby the powder offers the hard magnetic properties related to this structure.

The magnetization of saturation of the powder depends on the proportion of hexagonal ferrite phase (complete reaction) and amounts to at least 6 $mTg/cm^3$. The coercive field strength $_JH_c$ is about 400–500 kA/m and thus much exceeds that of conventional powders (>200 kA/m).

The powder of the invention can be separated by a light grinding process into its monocrystalline domains and oriented or directed magnets may be manufactured therefrom by compression in an external magnetic field and ensuing sintering. The orientability depends upon the completion of reaction and formation of the hexagonal ferrite structure. The higher the proportion of the crystalline phase, the better the orientability of the powder.

Amorphous or incompletely reacted ferrite powders, such as are described in part in the literature, are unsuited for the manufacture of anisotropic magnets.

The high coercive field strength of the material of the invention rests on the slight dimensions of the monocrystalline domains (primary grains) contained in the particles and on the low number of lattice defects and vacancies contained therein.

The manufacture of (isotropic or anisotropic) magnets from the powders of the invention is achieved by compacting (pressing) the powder with ensuing sintering. To facilitate sintering, auxiliary substances such as $SiO_2$, $As_2O_3$, $Bi_2O_3$, $TiO_2$ and $Al_2O_3$ may be contained in the powder. The auxiliary substances can be added in colloidal form. In This manner, it is possible to lower the sintering temperatures required for achieving an adequate density of the magnets ($\rho > 4.8$ $g/cm^3$), and thus to prevent the occurrence of oxygen vacancies in the crystal lattice, and simultaneously to prevent a pronounced growth in grain, which would lead to decreased coercive field strength.

Other auxiliary substances impede the growth of grain or are used to obtain a uniform structure (preventing the growth of giant grains).

Again other auxiliary substances are integrated by substitution into the lattice, for instance part of the iron atoms being replaced by aluminum atoms. Such substitutions may cause an increase in the coercive field strength when the substituents are distributed very homogeneously in the lattice.

The process of the invention for preparing the powder of the invention by atomizing a common solution of the participating substances into a hot reaction chamber allows precise control of the conditions of manufacture, whereby a powder properly reacted to completion and with a crystalline structure is obtained, the magnitudes of the monocrystalline domains contained in the individual particles being kept very small where desired by suitable selection and control of temperature of reaction, dwell time in the hot zone, droplet size, the concentration of the solution. The result is a high coercive field strength in the powder so prepared and simultaneously a good sintering activity.

The temperature of reaction and the dwell time in the reaction zone must be so selected that as complete as possible a ferrite mixed crystal formation will result, without thereby the primary grains present in the powder particles growing to exceed a diameter of 0.5 micron due to excessive temperature of reaction or too long a dwell time.

The powder with diameters of 1–10 microns obtained by the process of the invention is predominantly composed of hollow spherical agglomerates from primary grains which can be easily separated mechanically, electrically or magnetically, into their individual components.

Separation into single primary grains will be required where anisotropic magnets are to be made from the powder by pressing and ensuing sintering. The orientation of the monocrystalline domains is possible in view of the crystalline anisotropy of the hexagonal ferrite structure.

Further advantages, features and applicabilities of the invention will be further illustrated by reference to the accompnaying drawings, in which.

Figure 1:
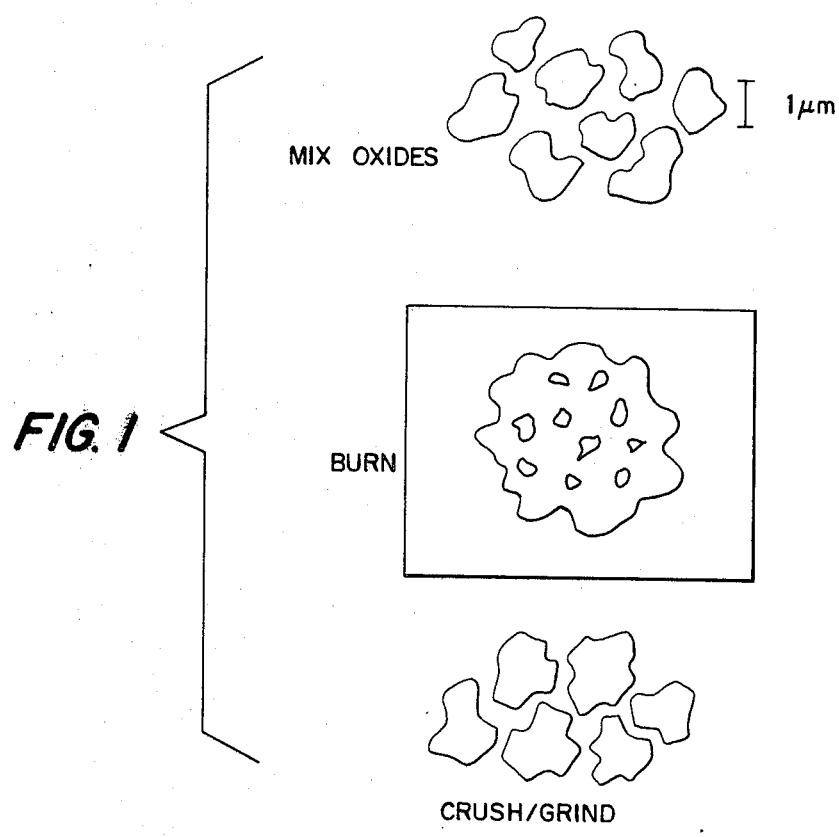
FIG. 1 is a schematic sketch of a process of the state of the art for preparing hard ferrites.

FIG. 1 shows a conventional process for making hard ferrites, a $Fe_2O_3$ powder being prepared from a $FeCl_2$ solution by spray-roasting. This powder is mixed with $BaCO_3$ ($SrCO_3$ or $PbO$), which is also present in powder form. Thereupon the mixture is burned, roughly comminuted, and ground as fine as possible, thus obtaining the barium ferrite powder for the manufacture of magnetic materials. Hard ferrites are prepared by compressing and sintering the initial material.

Figure 2:
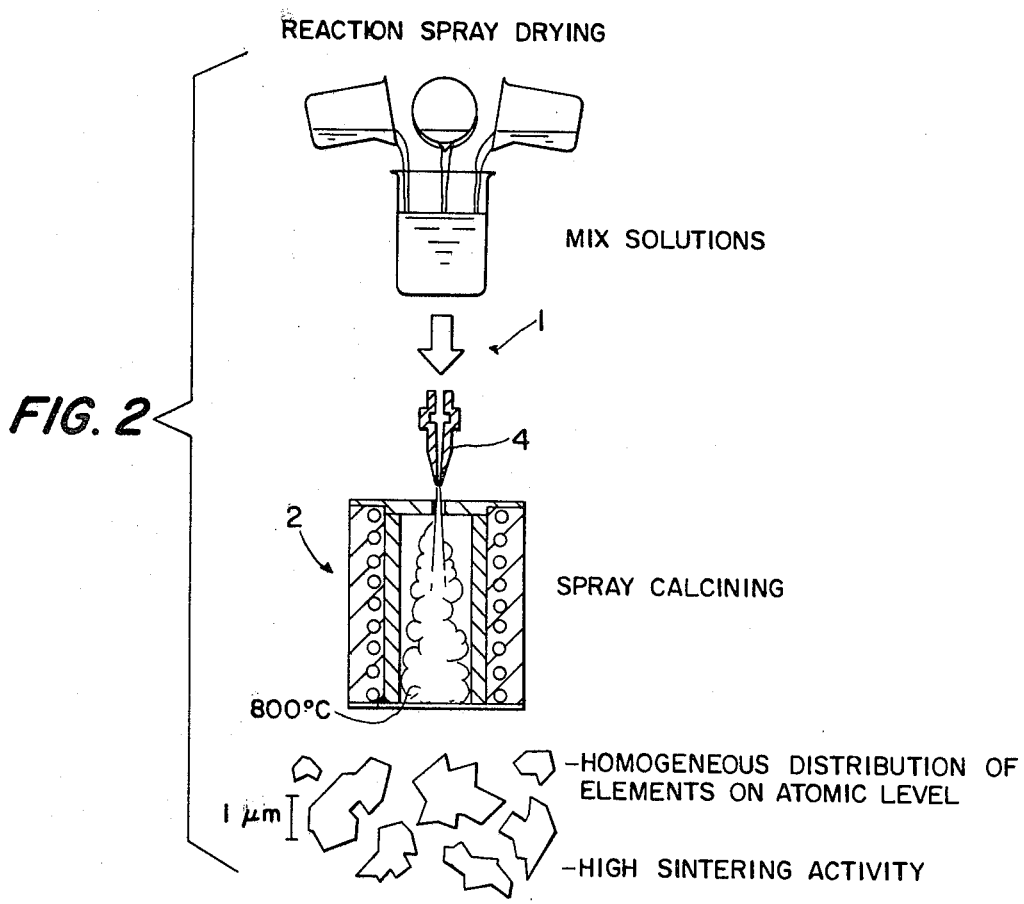
FIG. 2 is a sketch of the process of the invention for preparing hard ferrites.

The process of the invention is shown in FIG. 2. $Ba(MO_3)_2$ is added to a solution of $FeCl_2$ and the common solution 1 is then sprayed by a nozzle 4 into a reaction spray tube 2, the temperature in the reaction vessel being about 800° C. At this temperature, the particles react in nearly complete manner and ferrite mixed crystals form with a homogeneous distribution of the elements on the atomic scale, with high sintering activity, small size of the primary grains and therefore high coercive field strength.

Details of the process of the invention will be provided below:

PREPARING THE SOLUTION

The feed materials are solid salts of Ba and Fe, for instance barium carbonate or iron nitrate or barium nitrate, barium chloride and iron chloride, the latter being obtained as a waste product in rolling mill processes. To the extent these salts are water soluble, they are dissolved in the proportions of the desired composition in water (desalinated water was used in the laboratory tests). For salts of low water-solubility the solution takes place in acids diluted with water such as $HNO_3$, HCl, or acetic acid. If as high as possible a concentration is desired in the solution, it is heated and kept at a higher temperature (50°–90° C.) during the ensuing processing steps. Where appropriate, additives, in the form of water-soluble salts or salts soluble in diluted acids, are added. This procedure of adding additives or auxiliary substances is especially advantageous where the substitutional integration of the substances is desired in the final crystal lattice of the end product. If the auxiliary substances are desired to be in the form of precipitates in the end porduct, their addition to the solution in the form of a suspension may be advantageous.

Thereupon, the common solution is thoroughly mixed and, where appropriate, suspended or emulsified phases are homogenized during the further process steps, for instance by stirring.

SPRAYING

The solution is fed to an atomizing system (for instance a pneumatic nozzle, or by ultrasonics for the purpose of obtaining a narrowly bounded spectrum of droplet size and hence a narrowly bounded fraction of the resulting powder particles, for example by a piezoelectric oscillator) and separated into single drops (<30 microns). Compressed air can be used as the atomizing gas when utilizing a pneumatic nozzle.

REACTION VESSEL

As shown in FIG. 2, the reaction vessel 2 may be designed as a cylindrical temperature-resistant tube and may be made of quartz. The reaction vessel includes a heating means (resistance heating) at its surface. The tube surface temperature is for instance 1,200° C. for a heated length of about 1 m.

SEPARATING THE POWDER FROM THE GAS FLOW

The mixture of powder and gas issuing at the end of the reaction tube is fed through a centrifugal separator (not shown—where appropriate by taking an additional air— so that the powder is separated from the gas flow. Alternatively or additionaly, means may be provided for dust removal in an electrical, magnetic or wet manner. The solvent used may be recovered after separation of the ferrite powder by condensing the solvent vapors or by gas scrubbing. Additionally, the coarse powder components cn be separated in a cyclone and the fine powder components separated in a following electrical or magnetic separator.

GRINDING

To separate the powder particles into monocrystalline primary grains, the powder is lightly ground in a mill (for instance a ball mill, disc mill or air jet mill) between 20 minutes and 1 hour.

Figure 3:
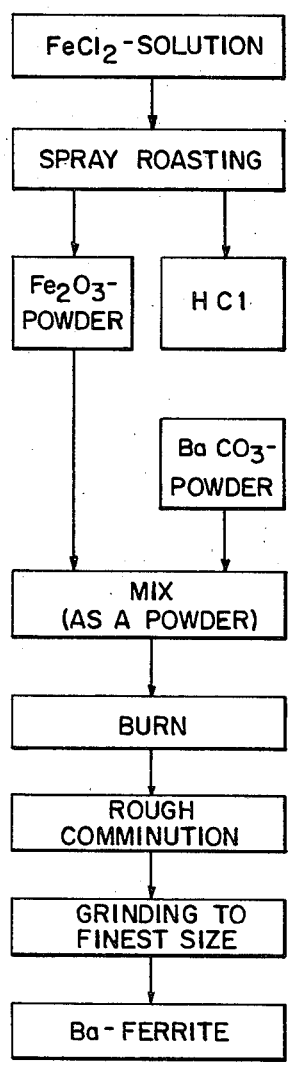
FIG. 3 is a comparison between the conventional process of manufacture and the novel process of the invention with respect to hard ferrites.
Figure 3:
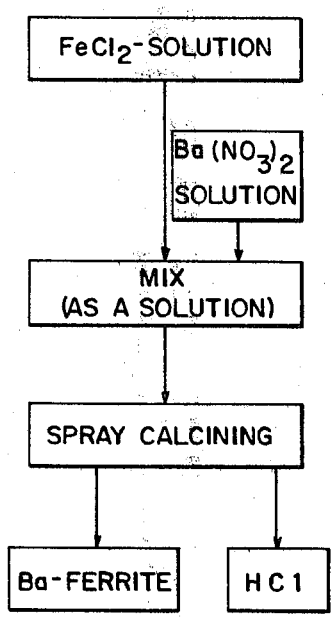

FIG. 3 shows a comparison between the known process and that of the invention. In the conventional process, the iron oxide required for the manufacture is obtained by a spray-roasting process (omitted in FIG. 1) from an iron chloride solution, with recovery of the hydrochloric acid used. This process step is carried out in steel rolling plants.

When using chlorides as the initial substances, it is not advantageous to use iron, barium (strontium) as chlorides. The alkaline earth chlorides are so stable that a completed reaction to hexaferrite takes place only at powder temperatures above 1,000° C.

Rather, the process of the invention rests on using iron in the form of iron chloride and barium or strontium in the form of the nitrate. When evaporating the solvent out of the droplets in the reactor, first the low-solubility alkaline earth nitrate precipitates and then the iron chloride. The alkaline earth nitrates can be converted into the oxides at very low temperatures, so that almost the completed reaction into hexaferrite takes place at powder temperatures of about 900° C.

Figure 4:
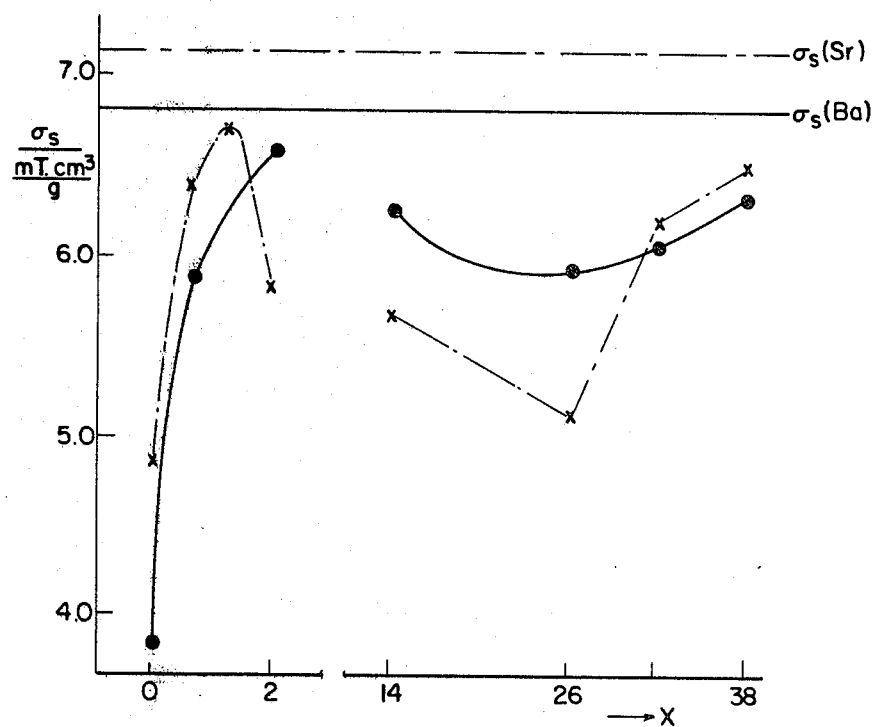
FIG. 4 is the saturation magnetization of various hard ferrites as a function of the nitrate content in the solution.

This can also be seen from FIG. 4, which shows the saturation magnetizations of various hard ferrites as a function of the nitrate content of the solution. The saturation magnetization (=completed reaction) has a maximum value for that content in nitrate which corresponds to the composition of iron as chloride, barium or Sr as nitrate.

In FIG. 4 X is the nitrate concentration of the solution; $X=0$ : $MeCl_2 + 12\ FeCl_2$, $X=2$ : $Me(NO_3)_2 + 12\ FeCl_2$, $X=14$ : $Me(NO_3)_2 + 8\ FeCl_2 + 4\ Fe(NO_3)_3$, $X=26$ : $Me(NO_3)_2 + 4\ FeCl_2 + 8\ Fe(NO_3)_3$, $X=38$ : $Me(NO_3)_2 + 12\ Fe(NO_3)_3$.

The invention will be further illustrated by reference to the following specific examples:

EXAMPLE 1

A 0.13 molar aqueous solution (based upon the end product $SrO \cdot 5.6Fe_2O_3$) of $Fe(NO_3)_3$ and $Sr(NO_3)_2$ is sprayed by means of a pneumatic two-material nozzle using compressed air and at a liquid flow rate of 3.9 l/h and an air flow rate of 0.8 m³/h into a hot reaction tube with a wall temperature of 1,320° C. and a length of 1.60 m and inside diameter of 28 cm. The powder is separated in a cyclone and the solvent vapors are removed. The maximum powder temperature was 950° C.

The magnetization saturation value of the powder is 6.52 mT·cm³/g and its coercive field strength is 406 kA/m.

EXAMPLE 2

A 0.04 molar aqueous solution (based upon the end product $SrO \cdot 5.5Fe_2O_3$) of $Sr(NO_3)_2$ and $FeCl_2$ is atomized as in Example 1, the flow rate of the solution being 8.9 l/h and the air flow rate being 7.6 m³/h. The wall temperature of the reactor is 1,260° C. and the maximum powder temperature is 900° C.

The saturation magnetization of the powder is 6.62 mT·cm³/g and its coercive field strength is 428 kA/m.

It will be obvious to those skilled in the art that many modifications may be made within the scope of the present invention without departing from the spirit thereof, and the invention includes all such modifications.

What is claimed is:

1. A process for preparing a hard ferrite powder of the composition $BaO \cdot 6Fe_2O_3$, said powder being composed of particles in the size range of about 1 to 10 microns which can be easily comminuted into primary grains and containing at least about 85% of primary grains with a hard magnetic hexagonal lattice structure and of a size less than, or equal to, 0.5 micron, which comprises spraying a 0.05 to 0.3 molar aqueous solution, based upon the product $BaFe_{12}O_{19}$, of ferrous chloride and barium nitrate into a hot zone of a reaction vessel, with the droplet size of said spray being less than about 30 microns, and with particles in the hot zone having a dwell time of about 2-10 seconds at a temperature of about 700° to 900° C.

2. A process according to claim 1 including adding auxiliary substances such as sintering aids or additives for preventing grain growth during a sintering process.

3. A process according to claim 2 in which said auxiliary substances are selected from the group consisting of $SiO_2$, $As_2O_3$, $Bi_2O_3$, $TiO_2$, and $Al_2O_3$.

4. A process according to claim 2 including adding the auxiliary substances in the form of a suspension.

5. A process according to claim 2 including adding the auxiliary substances in colloidal form.

6. A process according to claim 1 in which said spraying includes effecting atomization of the solution by means of single material or two-material nozzles.

7. A process according to claim 1 in which said spraying includes effecting atomization of the solution by ultrasonics for the purpose of obtaining a narrowly bounded spectrum of droplet size and hence a narrowly bounded fraction of the resulting powder particles.

8. A process according to claim 7 in which the ultrasonic atomization is implemented by a piezoelectric oscillator.

9. A process according to claim 1 including effecting powder separation outside the reaction vessel in a cyclone.

10. A process according to claim 1 including effecting separation of the powder by means of an electrical or magnetic separator.

11. A process according to claim 1 including effecting separation of coarse powder components in a cyclone and separation of fine powder components in a following electrical or magnetic separator.

12. A process according to claim 1 including recovering the solvent used after separation of the ferrite powder by condensing the solvent vapors or by gas scrubbing.

* * * * *